United States Patent [19]

Zabrocki et al.

[11] 4,360,452
[45] Nov. 23, 1982

[54] EMULSIFIER COMPOSITION

[75] Inventors: Karl Zabrocki, Buettgen; Kurt Schaupp, Cologne, both of Fed. Rep. of Germany

[73] Assignee: Bayer Aktiengesellschaft, Leverkusen, Fed. Rep. of Germany

[21] Appl. No.: 170,257

[22] Filed: Jul. 18, 1980

[30] Foreign Application Priority Data

Aug. 11, 1979 [DE] Fed. Rep. of Germany ....... 2932687

[51] Int. Cl.$^3$ ...................... B01F 17/36; B01D 19/04
[52] U.S. Cl. ..................... 252/356; 106/95; 252/312; 252/313 R; 252/321; 252/358; 252/DIG. 1
[58] Field of Search ............................. 252/312, 356

[56] References Cited

U.S. PATENT DOCUMENTS 2,158,374  5/1939  Merrill ................................. 252/312
3,996,134 12/1976  Osborn et al. ...................... 252/312

FOREIGN PATENT DOCUMENTS 1495748 11/1969 Fed. Rep. of Germany ...... 252/351

OTHER PUBLICATIONS

Ross: "Chemical Antifoaming Agents", Chemical Industries, May 1949, pp. 757-759.

*Primary Examiner*—Richard D. Lovering
*Attorney, Agent, or Firm*—Sprung, Horn, Kramer & Woods

[57] ABSTRACT

An emulsifier composition comprising (a) a non-ionic emulsifier having an HLB-value of about 10 to 20 and (b) a polyoxyalkylene-polyester of which about 5 to 50% by weight comprises polyoxyalkylene radicals. It may be used in admixture with phosphoric acid esters, serving to reduce foaming and prevent settling of aqueous suspensions such as cement and calcium sulfate slurries.

6 Claims, No Drawings

EMULSIFIER COMPOSITION

This invention relates to an emulsifier system which may be used in aqueous defoaming and anti-foaming agents together with other substances, particularly phosphoric acid esters.

The use of phosphoric acid esters as emulsifiers and/or dispersants for various applications is known (Ullmann, 4th Edition, Vol. 10, 456 (1975)). For example, they may be used in dyeing solutions, building materials, emulsion polymerization reactions and flotation processes.

Since phosphoric acid esters are immiscible with water, several phases are very easily formed when they are used in an aqueous medium. This gives rise to considerable disadvantages in practice. For example, phosphoric acid esters cannot be stored or metered in combination with aqueous systems.

The present invention provides emulsifier systems which contain a non-ionic emulsifier having an HLB-value of about 10 to 29 and a polyether-modified polyester emulsifier resin containing about 5 to 50% by weight, based on the emulsifier resin, of polyalkylene glycol residues.

The emulsifier systems according to the invention form with water-immiscible defoaming and/or anti-foaming agents, particularly with phosphoric acid esters, stable aqueous emulsions which do not alter even in the event of prolonged storage.

The emulsifier system according to the invention may advantageously be mixed with a number of aqueous formulations without the emulsion being broken and without the defoaming agent or the active ingredient of the mixture component being deactivated.

Non-ionic emulsifiers for the emulsifier systems according to the invention have an HLB-value of generally from 10 to 20 and preferably about 13 to 17. The HLB (hydrophilic-lipophilic balance) value is understood to be a dimensionless number between 0 to 20 which is indicative of solubility in water and oils (Ullmann, 4th Edition, Vol. 10, 462 (1975)).

The non-ionic emulsifiers for the emulsifier systems according to the invention are generally known (Ullmann, 4th Edition, Vol. 10,456 (1975)).

Preferred non-ionic emulsifiers for the emulsifier systems according to the invention are compounds corresponding to the following formula (I):

$$R^1-(OCH_2-CH_2)_n-OH \quad (I)$$

in which $R^1$ is an alkyl radical containing about 12 to 20 carbon atoms or the radical

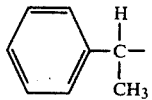

where $R^2$ is an alkyl radical containing about 4 to 20 carbon atoms or the radical:

$R^3$ represents hydrogen, hydroxy, methyl or phenyl, $r^4$ represents hydrogen or $C_1$–$C_{10}$ alkyl, n is from about 4 to 40, and x is from 2 to 3.5.

Alkyl radicals containing from 12 to 20 carbon atoms ($R^1$) may be straight-chain or branched hydrocarbon radicals which may contain 0,1 or 2 double bonds. Alkyl radicals containing about 12 to 18 carbon atoms are preferred. The following alkyl radicals are mentioned by way of example:

$C_{15}H_{25}$, $C_{14}H_{29}$, $C_{16}H_{31}$, $C_{18}H_{35}$, $C_{18}H_{33}$.

Alkyl radicals containing from 14 to 20 carbon atoms ($R^2$) may also be straight-chain or branched hydrocarbon radicals. In this case, alkyl radicals containing about 7 to 12 carbon atoms are preferred. The following alkyl radicals ($R^2$) are mentioned by way of example:

$C_8H_{17}$, $C_9H_{19}$, $C_{11}H_{23}$.

n is generally an integer of from 4 to 40, preferably about 6 to 35. In conjunction with formula (I), n represents an average number of polyethylene oxide units.

x: preferred range 2.5 to 3 x is generally a number of from 2 to 3.5 and preferably a number of from 2.5 to 3 (in conjunction with formula (I), x represents an average value and indicates the average degree of substitution).

Particularly preferred non-ionic emulsifiers corresponding to formula (I) are ethoxylated aliphatic substituted aromatic compounds. Thus, non-ionic emulsifiers according to the invention having particularly uniform particle sizes are obtained when ethoxylated p-n-nonyl phenol is used. Other preferred non-ionic emulsifiers corresponding to the formula (I) are obtained by ethoxylating addition products of styrene and its derivatives with phenols, are described for for example in German Pat. No. 1,121,814, according to which styrene, -methyl styrene or vinyl toluene are subjected to an addition reaction with phenol, cresols or xylene and the reaction products obtained are ethoxylated.

The following non-ionic emulsifiers are given as examples of those which can be used in the emulsifier systems according to the invention:

1 mole of nonyl phenol + 7 moles of ethylene oxide
1 mole of nonyl phenol + 10 moles of ethylene oxide
1 mole of nonyl phenol + 20 moles of ethylene oxide
1 mole of nonyl phenol + 30 moles of ethylene oxide
2.8 moles of styrene + 1 mole of phenol + 15 moles of ethylene oxide.

Other preferred non-ionic emulsifiers are hydrolyzed triglycerides. They may be hydrolyzed up to a level of 80%. Castor oil is mentioned as one example.

The polyether-modified polyester emulsifier resin of the emulsifier systems according to the invention preferably consists of an optionally oil-modified polyester component and a polyalkylene oxide component containing about 6 to 100 and preferably about 10 to 70 alkylene oxide residues per polyalkylene oxide chain and optionally terminated by alkoxy groups containing from 1 to 4 carbon atoms, the polyalkylene oxide component consisting of several individual polyalkylene oxide chains and the alkylene group containing from 2 to 4 and preferably 2 carbon atoms.

The polyether-modified polyester emulsifier resins may contain about 0.1 to 10% by weight and preferably about 0.5 to 5% by weight, based on the emulsifier resin, of urethane groups. In one preferred embodiment of the emulsifier system according to the invention, the polyalkylene oxides blocked at one end are reacted with substantially equimolar quantities of a diisocyanate to form polyalkylene oxides which contain per molecule one free isocyanate group which in turn may be used for attachment to the polyester component.

The polyesters preferably used for producing the polyester emulsifier resins may have an average molecular weight of about 400 to 4000 (as determined by vapor pressure osmometry in acetone).

The polyalkylene oxides used may be homopolyethers and also copolyethers in block or statistical distribution. Homopolyethylene oxides are particularly preferred starting materials for the production of the emulsifier resins.

Any diisocyanates may be used for attaching the polyester and polyalkylene oxide components. In general, it is particularly preferred to use commercially readily obtainable diisocyanates, for example 2,4- and 2,6-tolylene diisocyanate and mixtures of the isomers, 1,6-hexamethylene diisocyanate and 1-isocyanato-3,3,5-trimethyl-5-isocyanato-methylene cyclohexane.

The hydrophobic polyester component which is attached to the polyalkylene oxide component to form the emulsifier resin may be produced by conventional methods and from starting products known per se, as described for example in Römpp's Chemielexikon, Vol. 1, page 202, Franksch's Verlagsbuchhandlung, Stuttgart, 1966, or in The Chemistry of Organic Film Formers, pages 75 to 101, John Wiley & Sons Inc., New York, 1967.

Alcohols preferably used in the synthesis of the polyesters are aliphatic, cycloaliphatic and/or aromatic alcohols containing from 1 to 6 and preferably from 2 to 4 hydroxy groups bound to non-aromatic carbon atoms and from 1 to 24 carbon atoms per molecule, for example glycols, such as ethylene glycol, propylene glycol, butane diol, neopentyl glycol, trimethyl-1,3-pentane diol or hexane diols; ether alcohols, such as diethylene and triethylene glycols; ethoxylated bisphenols containing 2 alkylene oxide residues per molecule, such as bis(ethoxy)-bisphenol A; perhydrogenated bisphenols, such as dodecahydrobisphenol A; trimethylol ethane, trimethylol propane, trimethylol hexane, glycerol, pentaerythritol, dipentaerythritol, dimethylol cyclohexane, mannitol and sorbitol; and monohydric chain-terminating alcohols, such as methanol, propanol, butanol, cyclohexanol, 2-ethyl hexanol and benzyl alcohol.

Particularly preferred alcohols are neopentyl glycol, trimethylol propane, trimethylol cyclohexane and perhydrobisphenol.

The polyesters may contain up to about 15% by weight, based on the polyester, of co-condensed monohydric alcohol residues.

Preferred acid components for the synthesis of the polyesters are aliphatic, cycloaliphatic, saturated or unsaturated and/or aromatic polybasic carboxylic acids, preferably dicarboxylic and tricarboxylic acids containing about 4 to 12 carbon atoms per molecule and their esterifiable derivatives, such as for example anhydrides or esters, for example phthalic acid anhydride, isophthalic acid, terephthalic acid, tetrahydrophthalic and hexahydrophthalic acid anhydride, trimellitic acid anhydride, pyromellitic acid anhydride, maleic acid anhydride, fumaric acid, adipic acid, glutaric acid, succinic acid anhydride, azelaic acid, endomethylene tetrahydrophthalic acid, and halogenated acids, such as chlorophthalic acids and hexachloroendomethylene tetrahydrophthalic acid.

The polyesters may be synthesized solely from polycarboxylic acids and polyalcohols. However, they may also be modified by the co-condensation of monocarboxylic acids.

Monocarboxylic acids preferably used for the production of the polyesters are aliphatic, cycloaliphatic, saturated and/or aromatic monocarboxylic acids containing about 6 to 35 carbon atoms per molecule, such as benzoic acid, butyl benzoic acid, tolylic acid, hexahydrobenzoic acid, abietic acid, lactic acid, and also fatty acids, their mixtures and esters, such as linseed oil, soya oil, wood oil, safflower oil, castor oil, cottonseed oil, peanut oil, tall oil fatty acid, linseed oil fatty acid, soya oil fatty acid, wood oil fatty acid, safflower oil fatty acid, ricinene fatty acid and products obtained from natural, unsaturated oils or fatty acids either by conjugation or by isomerization. Preferred saturated fatty acids are, for example, coconut oil fatty acids, α-ethyl hexanoic acid, isononanoic acid and linear $C_{16}$ to $C_{18}$ monocarboxylic acids.

The polyesters may be produced by methods known per se (Houben-Weyl, Methoden der organischen Chemie, Georg Thieme Verlag Stuttgart, 1963, Vol 14/2, pages 1 to 5, 21 to 23 and 40 to 44; C. R. Martens, Alkyd Resin Technology, Reinhold Publ. Comp. 1961, pages 51 to 59). Alcohols, carboxylic acids or their derivatives and, optionally, oils are preferably reacted by melt or azeotropic esterification in an inert atmosphere at temperatures in the range of from 140° to 260° C. The process of the reaction may be followed, for example, by measuring the acid number and viscosity.

The polyesters may be modified with polyether either directly by the co-esterification of polyalkylene oxide units containing hydroxy groups or by reacting the polyesters with derivatives of polyalkylene oxides, for example by the polyaddition of polyalkylene oxides reacted with polyisocyanates, so-called hydrophilic isocyanate components. The number of acid groups in the polyether-modified polyesters can also be increased by semiester formation. The proportion of polyalkylene oxide units in the emulsifier resin generally amounts to between 5 and 50% by weight and preferably about 10 to 20% by weight, based on the emulsifier resin.

In one preferred embodiment of the emulsifier system according to the invention, the emulsifier resin in non-neutralized form contains carboxyl groups corresponding to an acid number (i.e. the quantity of solid potassium hydroxide in mg which is required to neutralize the carboxyl groups per g of emulsifier resin) of less than about 50 and preferably about 15 to 35. The emulsifier resin may be introduced into the emulsifier system according to the invention in partly or completely neutralized form. Preferred neutralizing agents are alkali metal hydroxides, such as sodium and/or potassium hydroxide, ammonia, primary, secondary and tertiary amines such as, for example, mono-, di- and triethanolamine, dimethyl ethanolamine, methyl diethanolamine and dimethyl aminomethyl propanol. However, it is also possible to carry out neutralization where the emulsifier system is used in an aqueous medium. In this case, alkalis and/or amines, preferably dimethyl ethanolamine, are preferably used for neutralization.

The process for producing the emulsifier resins are known per se (German Offenlegungsschriften Nos. 2,528,212 and 2,256,621).

Particularly stable dispersions are obtained by using an emulsifier resin which has been produced by preparing a polyester having an oil content of 0 to about 30% by weight, an acid number of or greater than 5 and a hydroxyl number (i.e. the analog to the acid number) of about 50 to 250 as the hydrophobic component, reacting it with the above-mentioned hydrophilic isocyanate components until the isocyanate group has been completely reacted, subsequently increasing the number of acid groups with a dicarboxylic acid anhydride to an acid number of about 15 to 35, and neutralizing the resin melt either by the direct addition of an amine or by subsequently adding the resin melt to an amine-containing water phase (optionally in practical application). Where the resin melt is added to an amine-containing water phase, the non-ionic emulsifier is preferably dissolved simultaneously so that the emulsifier system according to the invention is present in the aqueous phase. This is particularly advantageous in regard to practical application.

The emulsifier system according to the invention is used with particular advantage in conjunction with other water-immiscible defoaming and anti-foaming agents. Phosphoric acid esters and silicone oils are mentioned as examples of defoaming and anti-foaming agents.

More particularly, the emulsifier system according to the invention is used in conjunction with phosphoric acid esters. Phosphoric acid esters are known per se as defoaming and anti-foaming agents (Ullmann 4th Edition, Vol 10, page 456 (1975)).

It is preferred to use phosphoric acid esters corresponding to the following formula

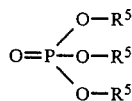

in which $R^5$ represents in each case $C_1$ to $C_{10}$ alkyl radicals.

The following phosphoric acid esters are mentioned by way of example: tri-n-butyl phosphate, tri-isobutyl phosphate, tri-n-amyl phosphate and tri-n-isoamyl phosphate.

Particularly preferred emulsifier systems according to invention advantageously form a single phase. They may be stored for prolonged periods without changing. No metering problems arise because all the components of the defoaming and anti-foaming agent according to the invention may be prepared in the optionally predetermined mixing ratio and do not have to be added in different quantities and at different times to the mixture to be applied during its application.

EXAMPLES

EXAMPLE 1 (Production of the Emulsifier)

(a) Non-ionic emulsifier

Ethylene oxide grafted onto nonyl phenol (molar ratio 1:20) with the following properties:

| | |
|---|---|
| Turbidity point (1% in water): | approximately 100° C. |
| Surface tension (0.1 g/l water): | 44.0 dyn/cm |
| Wetting effect (DIN 53901): | approximately 60 secs. at 60° C. |
| Mp: | approximately 30° C. |
| HLB-value: | 16 |

(b) Emulsifier resin:

400 g of an n-butanol-started polyethylene oxide alcohol having a molecular weight of 2000 are dehydrated in vacuo (15 Torr) for 30 minutes at 120° C. in a 2-liter stirrer-equipped vessel provided with an internal thermometer, stirrer, dropping funnel and gas-inlet pipe. 2 ml of benzoyl chloride are first stirred into the melt cooled to 100° C., after which 33.6 g of hexamethylene diisocyanate are added all at once.

After a reaction time of 60 minutes, the isocyanate content of the mixture is determined and amounts to between 1.8 and 1.9% (calculated: 1.94%).

After cooling of the melt, the hydrophilic isocyanate component suitable for further reactions is obtained in the form of a wax-like crystalline substance.

134 g of trimethylol propane and 130.7 g of tetrahydrophthalic acid anhydride are esterified under nitrogen at 220° C. up to an acid number of 4. The viscosity of the invention contain about 5 to 30 parts by weight of the non-ionic emulsifier and about 10 to 40 parts by weight of the polyether-modified polyester emulsifier resin, based on 100 parts by weight of the phosphoric acid ester. Especially preferred emulsifier systems contain about 11 to 18 parts by weight of the non-ionic emulsifier and about 15 to 25 parts by weight of the polyether-modified polyester emulsifier resin, based on 100 parts by weight of the phosphoric acid ester.

The emulsifier system according to the invention may be mixed with water in any quantities, particularly in combination with a phosphoric acid ester. It is also possible for these mixtures to contain up to about 15% of a water-soluble organic solvent. Suitable water-soluble organic solvents are, for example, methanol, ethanol and acetone.

The defoaming and anti-foaming agents according to the invention thus obtained in the aqueous phase may be used directly. They may be produced, for example, by mixing a combination of the polyether-modified polyester emulsifier resin and the phosphoric acid ester with a solution of the non-ionic emulsifier in water or, for example, by mixing a solution of the non-ionic emulsifier and the polyether-modified polyester emulsifier resin in water with the phosphoric acid ester. It is preferred to use a solution of the non-ionic emulsifier and the polyether-modified polyester emulsifier resin in water and to add it with stirring to the phosphoric acid ester. A slowly rotating stirrer is generally sufficient for stirring.

The defoaming and anti-foaming agents according to the invention may be directly used as additives. Suitable fields of application are, for example, the dyeing and finishing of textiles, polymerization processes carried out in the aqueous phase, the processing of latices to form materials and coating systems and, more particularly, the production of building materials.

Examples of building materials are concrete, mortar, gypsum, plasters, screeds.

The defoaming and anti-foaming agents according to the preliminary stage obtained corresponding to a flowout time of 170 seconds (as measured on a 60% solution in dimethyl formamide in accordance with DIN 53211 using a DIN-4 cup).

500 g of this preliminary stage are dehydrated in vacuo and subsequently reacted with 88.2 g of the hydrophilic isocyanate component at 100° to 105° C. until no more free isocyanate groups can be detected.

580 g of this product are reacted with 39 g of tetrahydrophthalic acid anhydride at 120° C. to form a polysemiester having an acid number of approximately 27.

26.1 g of dimethyl ethanolamine are carefully added with stirring at 95° to 100° C. to 610 g of this stage.

The resin solidifies on cooling to form a tough and elastic fusible mass.

The non-ionic emulsifier (a) and the emulsifier resin (b) are combined with one another in a ratio by weight of 3:4 and diluted to form an approximately 45% aqueous, slightly opaque solution characterized by good fluidity and handling properties. This solution is referred to as emulsifier concentrate in Example 2 below.

EXAMPLE 2

Production of an emulsion according to the invention 500 parts by weight of tributyl phosphate are introduced into a suitable vessel, followed by the gradual addition with stirring at room temperature of 375 parts by weight of the approximately 45% emulsifier concentrate. 100 g of water are then added and the mixture is stirred to form a homogeneous emulsion. The emulsion thus formed has a phosphoric acid ester content of approximately 51% by weight.

EXAMPLE 3

Mode of action of the product according to the invention

The defoaming effect was determined using a mixture of the type which may be used in the laying of fluid screeds of synthetic anhydrite. The flux used as a foaming-prone polycondensate of ditolyl ether sulphonic acid (or its sodium salt) with formaldehyde (=PDF).

The procedure was as follows:

| Basic formulation (=BF) | (1000 g of synthetic anhydrite (=CaSO$_4$) (1000 g of sand (0-3 mm) (280 g of water) |
|---|---|

In addition to the flux, PDF, the following mixtures were added, having been prepared 7 days before use:

| Mixture A | Mixture B |
|---|---|
| 75 g of PDF | 75 g of PDF |
| 7.5 g of tributyl phosphate | 14.7 g of the product according to the invention of Example 1 |
| 317.5 g of H$_2$O | 310.3 g of H$_2$O |

Both formulations were intensively mixed, subsequently introduced into 500 cc measuring cylinders and left standing therein until required for used.

In order to test the homogeneity of the product in use and the uniform effect of the product, two samples were taken from each mixture, one from the upper region and one from the lower region. Steps were taken to ensure that the liquids were not mixed during removal of the samples.

The results which are set out in Table 1 show the considerable improvement obtained with the product according to the invention over pure tributyl phosphate which was used in mixture A and which had completely settled at the surface in the standing aqueous solution.

EXAMPLE 4

A fluid concentrate was prepared from the following ingredients:

12 kg of Portland cement PZ 35 F
60 kg of sand+gravel (0-16 mm)
6.3 kg of water

The quantity of water represents 52.5%, based on the cement (i.e. WCF=0.525). This concrete and other concretes of the same composition, but containing 0.3% (based on cement) of a flux containing naphthalene sulphonic acid (NSF) and various quantities of the 51% product according to the invention based on tributyl phosphate according to Example 1, were tested to determine the slump factor, the gross density of the fresh concrete, the air content and the compressive strengths after 2 and 28 days in accordance with DIN 1048, Sheet 1 (May, 1974).

The results are set out in Table 2 and illustrate the excellent effect of the defoaming agent according to the invention which, in each case, was added to the mixing water in the form of a homogeneous aqueous solution which also contained the flux in dissolved form.

TABLE 1

| No. | Formulation | | | Slump in cm before/after 15 blows | Trace time in mins** | Remarks |
|---|---|---|---|---|---|---|
| 1 | BF | | | 12.0/16.5 | 0 | |
| 2 | BF | + | 7.5 g of PDF | 33.5/35.0 | 35 | heavy surface foam |
| 3 | BF | + | 7.5 g of PDF + 0.75 g of TBP | 32.0/34.5 | 30 | no foam |
| 4 | BF* | + | 40 g of mixture A (lower sample) | 33.0/35.0 | 35 | heavy foam |
| 5 | BF* | + | 40 g of mixture A (upper sample) | 31.5/33.0 | 25 | no foam |
| 6 | BF* | + | 40 g of mixture B (lower sample) | 33.0/34.5 | 30 | no foam |
| 7 | BF* | + | 40 g of mixture B (upper sample) | 32.5/34.5 | 35 | no foam |

*The quantity of water in mixtures A and B was allowed for in the formulation
**The trace time is the open time of the material ready for processing in which it flows freely

TABLE 2

| Sample No. | Additions in % NSF | Additions in % Product according to the invention of Example 1 | Slump [cm] | Gross density of fresh concrete kg/dm³ | Air content in % | Strengths in N/mm² (pressure) 2 days | Strengths in N/mm² (pressure) 28 days |
|---|---|---|---|---|---|---|---|
| 1 | 0 | 0 | 40.5 | 2.29 | 2.0 | 14.7 | 34.9 |
| 2 | 0.3 | 0 | 56.0 | 28 | 3.1 | 14.0 | 31.1 |
| 3 | 0.3 | 0.01 | 56.5 | 2.31 | 0.8 | 16.8 | 35.9 |
| 4 | 0.3 | 0.003 | 56.0 | 2.31 | 1.0 | 15.5 | 36.3 |
| 5 | 0.3 | 0.001 | 55.5 | 2.31 | 1.5 | 16.2 | 35.4 |
| 6 | 0.3 | 0.0003 | 56.0 | 2.31 | 1.7 | 14.3 | 34.3 |

EXAMPLES 5 to 9

9.7 parts of the neutralized 100% emulsifier resin described in Example 1b, 7.3 parts of the emulsifiers mentioned in Table 3, and 20.6 parts of H₂O are stirred at room temperature, after which 50 parts of tributyl phosphate are stirred in. After dilution with 10.6 parts of water, the mixture is stirred for about 1 hour at room temperature. The properties of the dispersions formed are shown in Table 3. They can all be stored without sedimenting.

TABLE 3

| Example No. | Emulsifier | Dispersion |
|---|---|---|
| 5 | 2.8 moles of styrene added to 1 mole of phenol + 15 moles of ethylene oxide | low viscosity homogeneous |
| 6 | 1 mole of nonyl phenol + 7 moles of ethylene oxide | low viscosity, milky |
| 7 | 1 mole of nonyl phenol + 10 moles of ethylene oxide | medium viscosity, milky |
| 8 | 1 mole of nonyl phenol + 30 moles of ethylene oxide | pasty-fluid readily dilutable |
| 9 | 1 mole of castor oil + 50 moles of ethylene oxide | pasty; viscosity reduced to low on addition of 30 parts of water |

It will be appreciated that the instant specification and examples are set forth by way of illustration and not limitation, and that various modifications and changes may be made without departing from the spirit and scope of the present invention.

We claim:

1. An emulsifier composition comprising by weight (a) about 5 to 30 parts of a non-ionic emulsifier having an HLB-value of about 10 to 20 and (b) about 10 to 40 parts of a polyoxyalkylene-polyester of which about 5 to 50% by weight comprises polyoxyalkylene radicals connected to the balance of the polyoxyalkylene-polyester molecules through urethane groups.

2. A composition according to claim 1, wherein the non-ionic emulsifier is of the formula $$R^1-(OCH_2-CH_2)_n-OH$$

in which $R^1$ is an alkyl radical containing about 12 to 20 carbon atoms or the radical

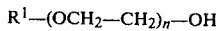

$R^2$ is an alkyl radical containing about 4 to 20 carbon atoms or the radical

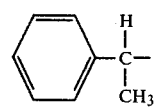

$R^3$ is hydrogen, methyl or phenyl
$R^4$ is hydrogen or $C_1$-$C_{10}$ alkyl,
n is from about 4 to 40, and
x is from 2 to 3.5.

3. A composition according to claim 1, wherein the non-ionic emulsifier is a hydroxylated triglyceride.

4. A composition according to claim 1, further comprising (c) a phosphoric acid ester.

5. A composition according to claim 1, further comprising 100 parts by weight of a phosphoric acid ester.

6. A composition according to claim 5, wherein the non-ionic emulsifier is of the formula $$R^1-(OCH_2-CH_2)_n-OH$$

in which $R^1$ is an alkyl radical containing about 12 to 20 carbon atoms or the radical

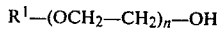

$R^2$ is an alkyl radical containing about 4 to 20 carbon atoms or the radical

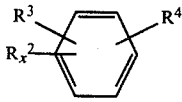

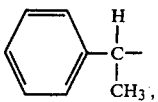

$R^3$ is hydrogen, methyl or phenyl,
$R^4$ is hydrogen or $C_1$-$C_{10}$ alkyl,
n is from about 4 to 40, and
X is from 2 to 3.5,
the polyoxyalkylene moieties containing about 6 to 100 oxyalkylene units each with 2 to 4 carbon atoms, and the phosphoric acid ester being of the formula

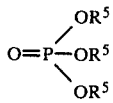

in which $R^5$ each independently is an alkyl radical of up to about 10 carbon atoms.

* * * * *